US012007362B2

(12) United States Patent
Jin et al.

(10) Patent No.: US 12,007,362 B2
(45) Date of Patent: Jun. 11, 2024

(54) METHOD FOR RECONSTRUCTING CRACK PROFILES BASED ON COMPOSITE-MODE TOTAL FOCUSING METHOD

(71) Applicant: Dalian University of Technology, Liaoning (CN)

(72) Inventors: Shijie Jin, Liaoning (CN); Li Lin, Liaoning (CN); Chenfei Liu, Liaoning (CN); Zhongbing Luo, Liaoning (CN)

(73) Assignee: Dalian University of Technology, Dalian (CN)

( * ) Notice: Subject to any disclaimer, the term of this patent is extended or adjusted under 35 U.S.C. 154(b) by 414 days.

(21) Appl. No.: 17/549,908

(22) Filed: Dec. 14, 2021

(65) Prior Publication Data
US 2022/0107290 A1    Apr. 7, 2022

Related U.S. Application Data

(63) Continuation-in-part of application No. PCT/CN2020/124195, filed on Oct. 28, 2020.

(30) Foreign Application Priority Data

Jul. 20, 2020   (CN) .......................... 202010696063.0

(51) Int. Cl.
*G01N 29/06*   (2006.01)
*G01N 29/44*   (2006.01)

(52) U.S. Cl.
CPC ..... *G01N 29/0645* (2013.01); *G01N 29/4472* (2013.01); *G01N 2291/023* (2013.01)

(58) Field of Classification Search
CPC ........... G01N 29/0645; G01N 29/4472; G01N 2291/023; G01N 29/043; G01N 2291/044;

(Continued)

(56) References Cited

U.S. PATENT DOCUMENTS

| 6,393,917 B1 * | 5/2002 | Suh ........................ G01N 29/52 |
| | | 73/628 |
| 2007/0000328 A1 * | 1/2007 | Buttram ................... G01H 5/00 |
| | | 73/597 |

(Continued)

FOREIGN PATENT DOCUMENTS

| CN | 106093205 B  * | 4/2019 | ........... G01N 29/069 |
| KR | 20070065934 A  * | 6/2007 | |
| KR | 102037692 B1 * | 11/2019 | |

OTHER PUBLICATIONS

KR-102037692-B1_translated (Year: 2019).*
CN-106093205-B_translated (Year: 2019).*
KR-20070065934-A_translated (Year: 2007).*

*Primary Examiner* — Manish S Shah
*Assistant Examiner* — Michael J Singletary

(57) ABSTRACT

A method for reconstructing the crack profiles based on the composite-mode total focusing method (CTFM), including: selecting the parameters for phased array ultrasonic testing; acquiring the A-scan signal matrix; establishing the coordinate system and grid division of the region of interest (ROI); determining the wave modes; solving the positions of the refracted points; reconstructing the image by CTFM; and realizing the quantification, positioning, and orientation of cracks. The A-scan signal matrix including 21 views is acquired. Based on Fermat's principle, the refracted points at the interface between wedge and sample for the 21 views are calculated, to obtain the corresponding amplitude for each view in the ROI. For each reconstruction point, the strongest response is selected from the 21 views. The profiles of the cracks with different orientation angles are reconstructed by CTFM.

1 Claim, 4 Drawing Sheets

(58) Field of Classification Search
CPC .. G01N 29/11; G01N 29/2487; G01N 29/348; G01N 29/262; G01N 29/44
See application file for complete search history.

(56) References Cited

U.S. PATENT DOCUMENTS

2013/0081468 A1* 4/2013 Falter ................... G01N 29/043
 73/614
2021/0132004 A1* 5/2021 Lepage ............... G01S 15/8915

* cited by examiner

METHOD FOR RECONSTRUCTING CRACK PROFILES BASED ON COMPOSITE-MODE TOTAL FOCUSING METHOD

CROSS-REFERENCE TO RELATED APPLICATIONS

This application is a continuation-in-part of International Patent Application No. PCT/CN2020/124195 with an international filing date of Oct. 28, 2020, designating the United States, and further claims priority benefits to Chinese Patent Application No. 202010696063.0 filed Jul. 20, 2020. The contents of all of the aforementioned applications, including any intervening amendments thereto, are incorporated herein by reference.

BACKGROUND

Field of the Invention

The present application relates to the technical field of non-destructive testing technique, and more particularly to a method for reconstructing crack profiles based on a composite-mode total focusing method (CTFM).

Description of the Related Art

Quantification, positioning, and orientation of cracks are always concerned in the field of non-destructive testing. The conventional phased array ultrasonic testing (PAUT) technique is advantageous in high detection sensitivity in planar defects, intuitive display of imaging results, accuracy in defect quantification and location, thus being extensively applied to crack detection. However, the conventional PAUT can only present the characteristics of the crack tips, with the imaging results affected by crack orientation, cannot obtain the complete profile information of the to-be-measured cracks, and may even lead to misjudgment of defect type and result in underestimating the damage degree induced by defects.

To solve the above problems, scholars at home and abroad have combined signal processing techniques to improve imaging quality, and strive to visually, comprehensively, and accurately present the characteristics of cracks. Reverse time migration can obtain approximate crack profiles, but the applicability is greatly affected by noise with low calculation efficiency. For the total focusing method (TFM), ultrasonic waves are sequentially excited by every element in phased array and received by all elements to obtain the full matrix capture (FMC) data containing more crack information. This method can improve the image resolution and signal-to-noise ratio, but cannot characterize the whole crack profiles. On this basis, a total of 21 views can be provided in considering direct, half-skip, and full-skip modes. The view with the best directivity can be selected from the above 21 views for the to-be-measured crack with specific orientation to implement delay-and-sum beamforming, obtaining the crack profiles. This method is named as multi-mode total focusing method (MTFM), and its applicable range is affected by the crack orientation. The appropriate angle range for profile reconstruction in every view is generally less than 20°, and no one specific view can provide the whole profile of any defect. Especially, it is difficult to determine the suitable view for the priori unknown planar defect, reducing the detection efficiency and reliability.

SUMMARY

The object of the present application to provide a method for reconstructing crack profiles based on a composite-mode total focusing method to tackle the problem that the detailed crack information is difficult to characterize. The method provided by embodiments of the present application adopts the ultrasonic phased array probe with an angle wedge to acquire the A-scan signal matrix and perform delay-and-sum process point by point in the region of interest (ROI) to realize the complete profile reconstruction of the cracks with different orientation angles.

To achieve the above object, in accordance with one embodiment of the invention, the CTFM is provided for reconstructing crack profiles and implementing quantitative detection. The detection system comprising an ultrasonic phased array device, a phased array probe, and an angle wedge is adopted to acquire the A-scan signal matrix. Based on Fermat's principle, the refracted points of ultrasonic waves at the interface between wedge and sample are calculated to obtain the corresponding amplitude for each view in the ROI. For each reconstructed point, the view having the strongest response is selected from the 21 views. The profiles of the cracks with different orientation angles are reconstructed by delay-and-sum beamforming.

The method comprises the following steps:

(a) selection of parameters for detection, comprising:
selecting the parameters for detection according to the material, shape, and size of the to-be-measured sample, where the parameters comprise: the frequency of ultrasonic phased array probe, the number of array elements, and the wedge angle;

(b) acquisition of the A-scan signal matrix, comprising:
acquiring the A-scan signal matrix comprising different views at one time by using the FMC function of the ultrasonic phased array device, based on the selected parameters for ultrasonic testing, and saving the A-scan signal matrix in the txt format, in which, for an ultrasonic phased array probe having n elements, the number of the A-scan signals in matrix is $n^2$;

(c) establishment of coordinate system and grid division of ROI, comprising:
establishing the coordinate system by defining the interface between wedge and sample as the x-axis, defining the projection point from the center position of the first element of the phased array probe to the x-axis as the coordinate origin, defining the direction of the leading edge of the wedge as the positive direction of the x-axis, and defining the depth direction of the sample as the positive direction of the y-axis; and dividing the ROI into M×N rectangular grids, wherein the grid nodes are image reconstruction points;

(d) determination of the wave modes, comprising:
classifying the wave modes as three types according to the different propagation paths of ultrasonic beams, where the three types of wave modes comprise:
the direct mode, where the ultrasonic beam is emitted by one element, interacts with the crack, and is directly received by array element;
the half-skip mode, where the ultrasonic beam is emitted by one element and reflected by the bottom of the to-be-measured sample, interacts with the crack, and is received by array element; and
the full-skip mode, where the ultrasonic beam is emitted by one element and reflected by the bottom of the to-be-measured sample, interacts with the crack, is reflected by the bottom of the sample, and is received by array element; and
mode conversion occurs at the interface between wedge and sample, the bottom of the sample, and the crack surface, so the three types of wave modes are divided into 21 views, which contain 3 views in direct mode (LL, TT, and LT, where L for longitudinal wave and T for transverse wave), 8 views in half-skip mode (TLT, LLT, TTT, LTT, LLL, TLL, TTL, and LTL), and 10 views in full-skip mode (LLLL, TTTT, LLLT, LLTT, LLTL, LTLT, TLTT, TLTL, LTTT, and LTTL);

(e) solving the positions of the refracted points, comprising:

defining the abscissas of the refracted points at the interface between wedge and sample for the emitted and received signals in view p as $x_{pi}$ and $x_{pj}$, respectively; establishing equation (1) according to Fermat's principle:

$$\frac{\partial t_{pi}}{\partial x_{pi}} = \frac{\partial t_{pj}}{\partial x_{pj}} = 0, \quad (1)$$

where $1 \le p \le 21$, $t_{pi}$ is the travel time of the ultrasonic beam excited from the i-th element and to the reconstruction point, and $t_{pj}$ is the travel time of the ultrasonic beam from the reconstruction point to the j-th element, where $1 \le i \le n$ and $1 \le j \le n$; and calculating $t_{pi}$ and $t_{pj}$ according to the ray paths of ultrasonic beams and the wave modes;

(f) image reconstruction by CTFM, comprising:

for each reconstruction point (a, b) in the ROI, where $1 \le a \le M$, $1 \le b \le N$, selecting the strongest response from the 21 views for the signal $A_{ij}$ transmitted by the i-th element and received by the j-th element as the corresponding reconstruction amplitude $I_{ij}(a, b)$:

$$I_{ij}(a, b) = \max_{1 \le p \le 21} (A_{ij}(t_p(a, b))), \quad (2)$$

in which, $t_p(a, b)$ is the travel time following the path of the p-th view via the reconstruction point (a, b);

repeating the above steps point by point in the ROI to obtain the reconstructed image by CTFM, where the composite delay-and-sum amplitude I(a, b) of the image reconstruction point (a, b) is:

$$I(a, b) = \sum_{i=1}^{n} \sum_{j=1}^{n} I_{ij}(a, b); \quad (3)$$

and (g) quantification, positioning, and orientation of cracks, comprising:

using the −6 dB drop rule to obtain the depths, lengths, and inclined angles of the cracks with different orientation angles according to the CTFM image.

Advantages of the method for reconstructing the crack profiles based on CTFM according to embodiments of the present application are summarized as follows: the method adopts a set of phased array ultrasonic probe and wedge. By only one time signal acquisition, the profiles of the cracks with different orientation angles can be reconstructed, providing effective solutions for the precise quantification of the crack length, depth, and orientation angle. Meanwhile, the algorithm involved in this method can be embedded into the detection device to realize the quantitative detection of cracks with unknown orientation, making the method have high engineering application and promotion value.

BRIEF DESCRIPTION OF THE DRAWINGS

The invention is described hereinbelow with reference to the accompanying drawings, in which.

DETAILED DESCRIPTION OF THE EMBODIMENTS

To further illustrate the invention, embodiments detailing the method for reconstructing the crack profiles based on CTFM are described below. It should be noted that the following embodiments are intended to describe and not to limit the invention.

Figure 1:
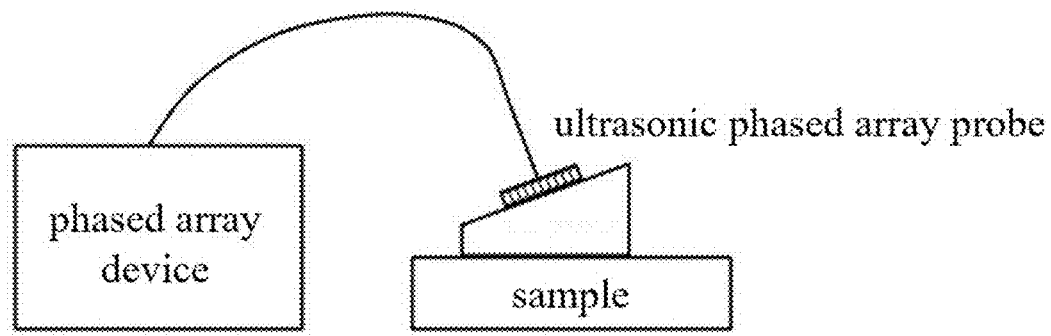
FIG. 1 is a schematic diagram of the ultrasonic detection system according to an embodiment of the present application.
Figure 2:
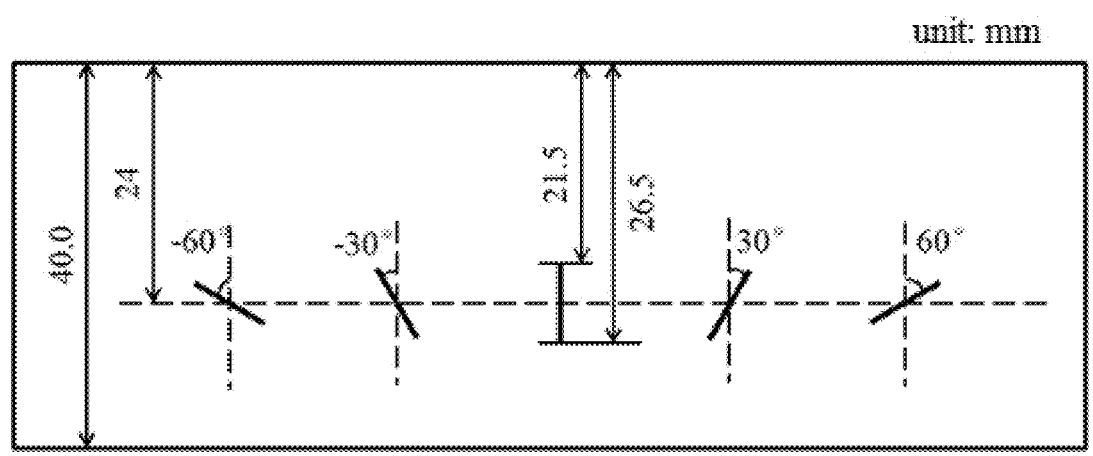
FIG. 2 is a schematic diagram of the to-be-inspected samples containing the cracks with different orientation angles according to an embodiment of the present application.

A method for reconstructing the crack profiles based on CTFM adopts an ultrasonic detection system shown in FIG. 1, which comprises: an ultrasonic phased array device, a phased array ultrasonic probe, and an angle wedge. The specific steps are as follows:

(a) The to-be-inspected sample is a carbon steel block having a thickness of 40 mm. Cracks having a central depth of 24 mm, a length of 5 mm, and orientation angles of 0°, ±30°, and ±60° (defining the vertical direction having an orientation angle of 0° and defining the clockwise direction as positive direction) are manufactured in the sample, as shown in FIG. 2.

The sample is detected by adopting an ultrasonic phased array device, a phased array ultrasonic probe having 5 MHz center frequency and 64 elements, in combination with a 45° angle wedge. The height of the first element in probe is 18.82 mm, the sampling frequency is 100 MHz, the longitudinal wave velocity in wedge is 2330 m/s, and the transverse wave and longitudinal wave velocities in sample are 3230 m/s and 5900 m/s, respectively.

(b) The FMC function of the ultrasonic phased array device is adopted to acquire signals from the sample, and the A-scan signal matrix comprising different views is obtained and output in the data text format. The number of A-scan signals is $64^2 = 4096$.

Figure 3:
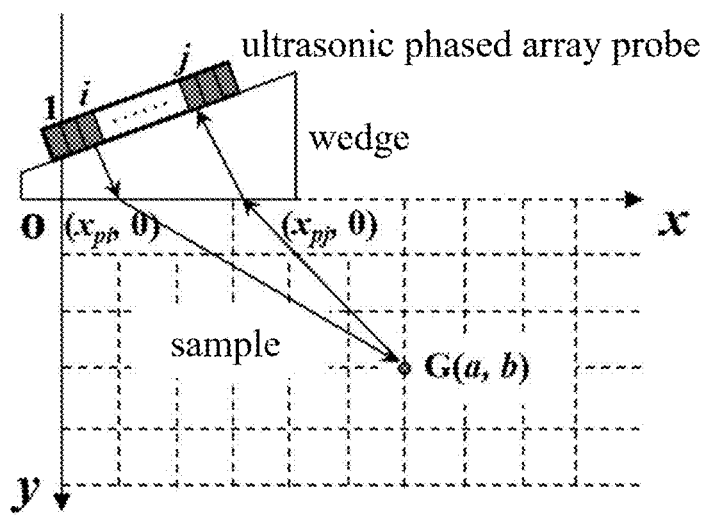
FIG. 3 is a schematic diagram of the coordinate system established during signal acquisition according to an embodiment of the present application.
Figure 4:
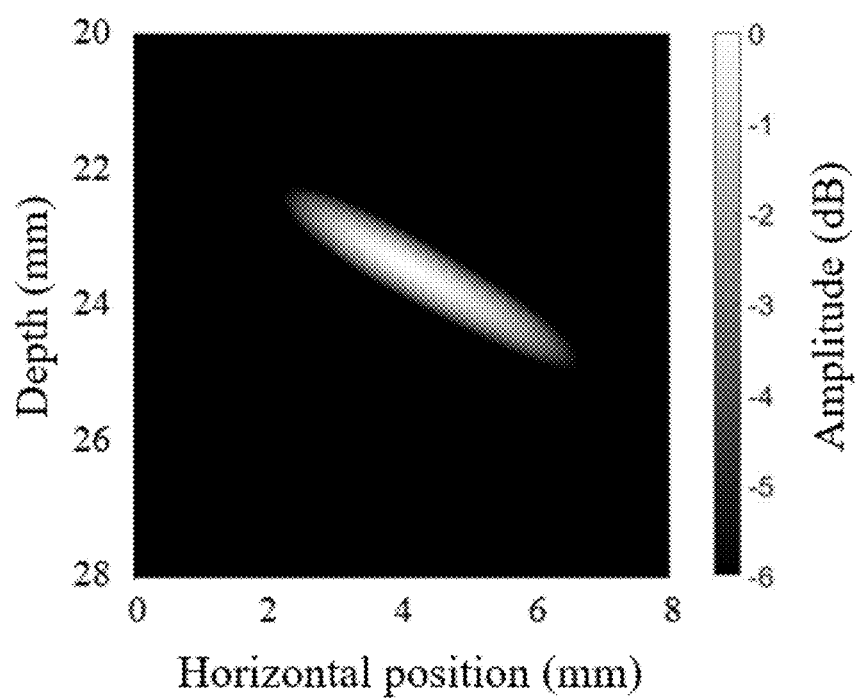
FIG. 4 is a reconstructed image of the crack with a central depth of 24 mm, a length of 5 mm, and an orientation angle of −60° by CTFM according to an embodiment of the present application.
Figure 5:
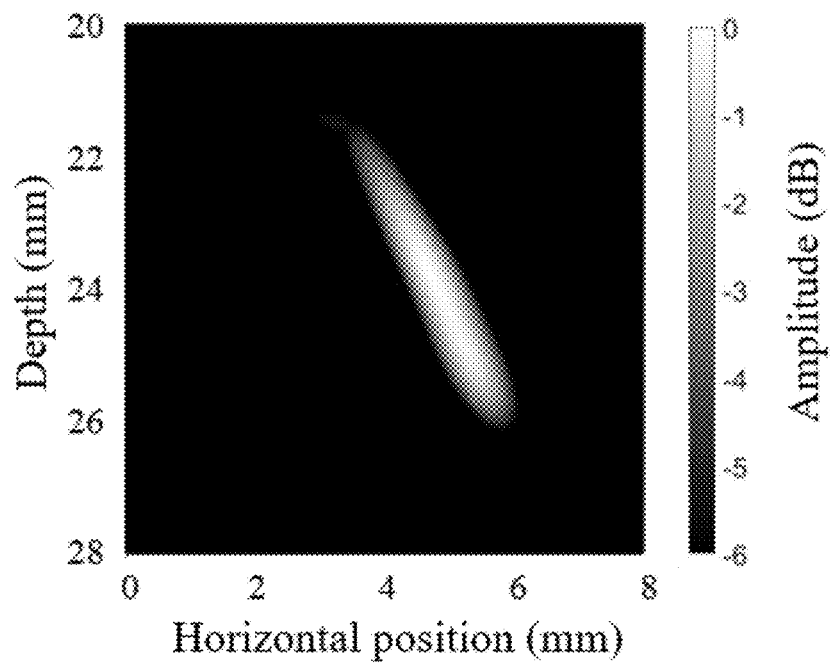
FIG. 5 is a reconstructed image of the crack with a central depth of 24 mm, a length of 5 mm, and an orientation angle of −30° by CTFM according to an embodiment of the present application.
Figure 6:
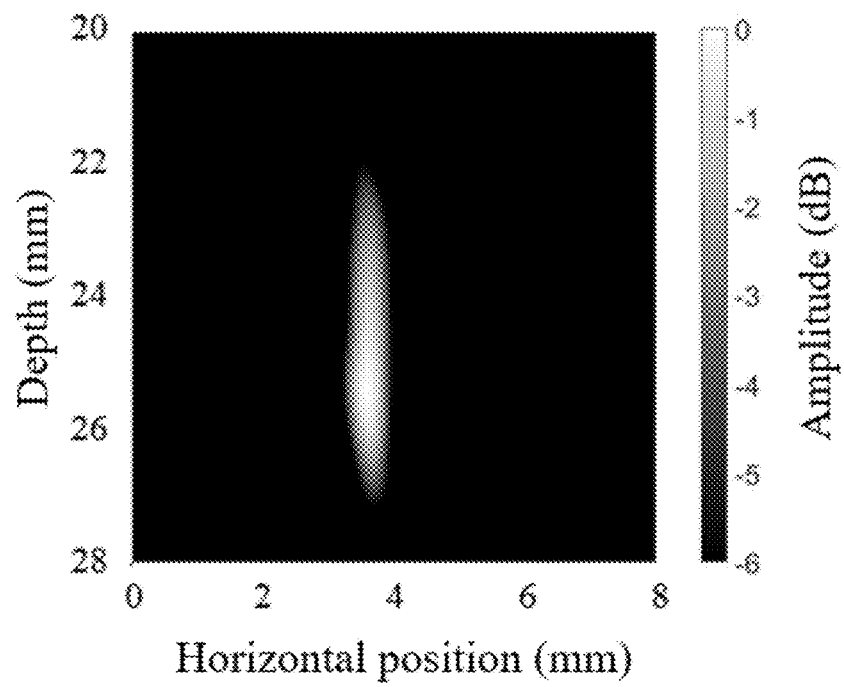
FIG. 6 is a reconstructed image of the crack with a central depth of 24 mm, a length of 5 mm, and an orientation angle of 0° by CTFM according to an embodiment of the present application.
Figure 7:
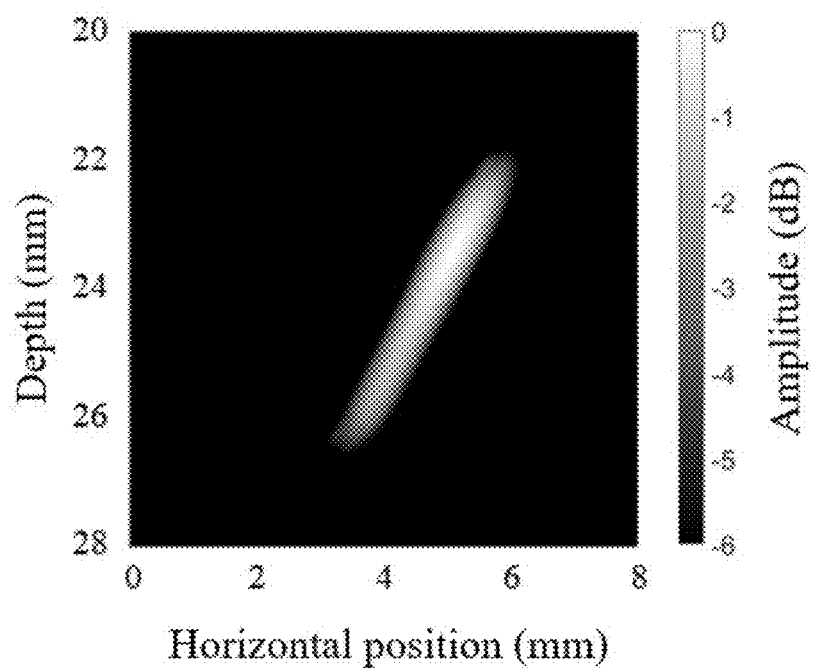
FIG. 7 is a reconstructed image of the crack with a central depth of 24 mm, a length of 5 mm, and an orientation angle of 30° by CTFM according to an embodiment of the present application.
Figure 8:
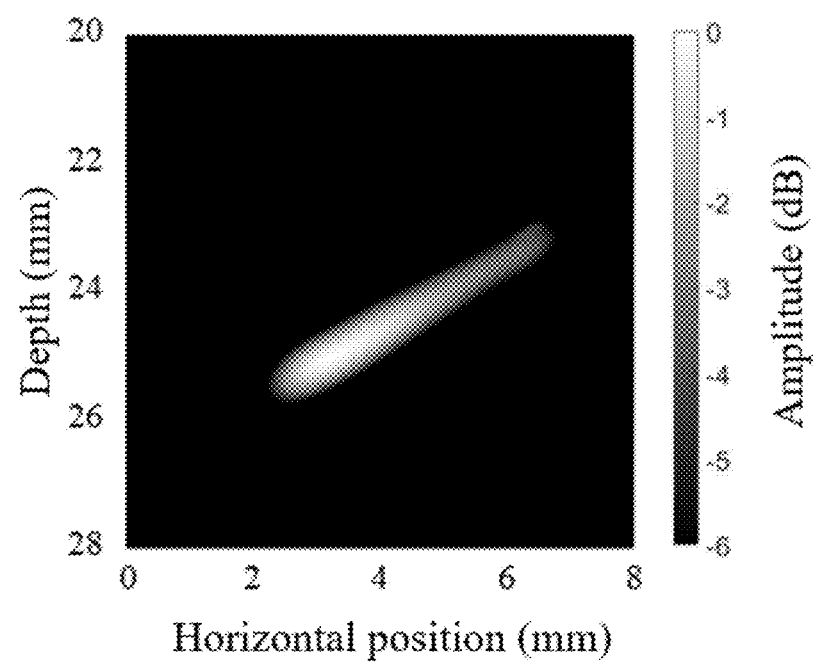
FIG. 8 is a reconstructed image of the crack with a central depth of 24 mm, a length of 5 mm, and an orientation angle of 60° by CTFM according to an embodiment of the present application.

(c) Establishment of a rectangular coordinate system is shown in FIG. 3. The coordinate system is established by defining the interface between the wedge and the sample as the x-axis, defining the projection point from the center of the first element in probe to the x-axis as the coordinate origin, defining the direction of the leading edge of the wedge as the positive direction of the x-axis, and defining the depth direction of the sample as the positive direction of the y-axis. And the ROI is divided into 100×100 rectangular grids.

(d) Wave modes are classified into three types according to the different propagation paths of ultrasonic beams, where the three types of wave modes comprise: the direct mode, where the ultrasonic beam is emitted by one element, interacts with the crack, and is directly received by array element; the half-skip mode, where the ultrasonic beam is emitted by one element and reflected by the bottom of the to-be-measured sample, interacts with the crack, and is received by array element; and the full-skip mode, where the ultrasonic beam is emitted by one element and reflected by the bottom of the to-be-measured sample, interacts with the crack, is reflected by the bottom of the sample, and is received by array element. Mode conversion occurs at the interface between the wedge and the sample, the bottom of the sample, and the crack surface, so the three types of wave modes are divided into 21 views, which contain 3 views in direct mode (LL, TT, and LT, where L for longitudinal wave and T for transverse wave), 8 views in half-skip mode (TLT, LLT, LT, TTT, LTT, LLL, TLL, TTL, and LTL), and 10 views in full-skip mode (LLLL, TTTT, LLLT, LLTT, LLTL, LTLT, TLTT, TLTL, LTTT, and LTTL).

(e) Solving the positions of the refracted points, comprising:

Abscissas of the refracted points at the interface between wedge and sample for the emitted and received signals in view p are respectively defined as $x_{pi}$ and $x_{pj}$, where $1 \le i \le n$ and $1 \le j \le n$. Equation (1) is established according to Fermat's principle:

$$\frac{\partial t_{pi}}{\partial x_{pi}} = \frac{\partial t_{pj}}{\partial x_{pj}} = 0, \quad (1)$$

where $1 \le p \le 21$, $t_{pi}$ is the travel time of the ultrasonic beam excited from the i-th element and to the reconstruction point, and $t_{pj}$ is the travel time of the ultrasonic beam from the reconstruction point to the j-th element. $t_{pi}$ and $t_{pj}$ are calculated according to the ray path of ultrasonic beam and the wave mode.

(f) Image reconstruction by CTFM, comprising:

for each image reconstruction point (a, b) in the ROI, where $1 \le a \le M$, $1 \le b \le N$, the strongest response from the 21 views for the signal $A_{ij}$ transmitted by the i-th element and received by the j-th element is selected as the corresponding reconstruction amplitude $I_{ij}(a, b)$:

$$I_{ij}(a, b) = \max_{1 \le p \le 21} (A_{ij}(t_p(a, b))), \quad (2)$$

in which, $t_p(a, b)$ is the travel time following the path of the p-th view via the reconstruction point (a, b);

The above steps are repeated point by point in the ROI to obtain the reconstructed image by CTFM, where the composite delay-and-sum amplitude I(a, b) of the image reconstruction point (a, b) is:

$$I(a, b) = \sum_{i=1}^{n} \sum_{j=1}^{n} I_{ij}(a, b). \quad (3)$$

(g) Delay-and-sum beamforming is performed on the 21 views to obtain the CTFM image. FIGS. 4-8 sequentially show the CTFM images of the cracks having orientation angles of −60°, −30°, 0°, 30°, and 60°. It can be seen that these figures have good imaging quality, high image resolution, realizing the complete characterization of crack profiles. It can be calculated that the measured lengths of the cracks having orientation angles of −60°, −30°, 0°, 30°, and 60° are 5.11 mm, 5.38 mm, 5.15 mm, 5.38 mm, and 5.20 mm, respectively; the measured central depths of the cracks having orientation angles of −60°, −30°, 0°, 30°, and 60° are 23.60 mm, 23.78 mm, 24.58 mm, 24.21 mm, and 24.30 mm, respectively; and the measured orientation angles of the cracks having orientation angles of −60°, −30°, 0°, 30°, and 60° are −59.42°, −30.78°, −0.56°, 29.76°, and 59.98°, respectively. Compared to the preset cracks, the quantitative errors of crack length, central depth, and orientation angle do not exceed 0.38 mm, 0.58 mm, and 0.78°, respectively. This method realizes the profile reconstruction of the cracks with different orientation angles, and the quantitative and positioning errors are small, satisfying the engineering requirements.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

What is claimed is:

1. A method for reconstructing crack profiles based on a composite-mode total focusing method, wherein
    a detection system comprising an ultrasonic phased array device, a phased array probe, and an angle wedge is adopted to acquire A-scan signal matrix;
    based on Fermat's principle, refracted points of ultrasonic waves at an interface between a wedge and a sample are calculated to obtain a corresponding amplitude for each view in a region of interest;
    for each reconstructed point, a view having a strongest response is selected from 21 views;
    the crack profiles corresponding to different orientation angles are reconstructed by delay-and-sum beamforming; and
    the method comprises the following steps:
    (a) selection of parameters for detection, comprising:
    selecting parameters for detection according to a material, a shape, and a size of a to-be-measured sample, where the parameters comprise: a frequency of an ultrasonic phased array probe, the number of array elements, and a wedge angle;
    (b) acquisition of an A-scan signal matrix, comprising:
    acquiring the A-scan signal matrix comprising different views at one time by using a full matrix capture function of the ultrasonic phased array device, based on selected parameters for ultrasonic testing, and saving the A-scan signal matrix in a txt format, in which, for an ultrasonic phased array probe having n elements, the number of the A-scan signals in matrix is $n^2$;

(c) establishment of a coordinate system and grid division of the region of interest, comprising:

establishing the coordinate system by defining the interface between the wedge and the sample as an x-axis, defining a projection point from a center position of a first element of the phased array probe to the x-axis as a coordinate origin, defining a direction of a leading edge of the wedge as a positive direction of the x-axis, and defining a depth direction of the sample as a positive direction of a y-axis; and dividing the region of interest into M×N rectangular grids, wherein grid nodes are image reconstruction points;

(d) determination of wave modes, comprising:

classifying the wave modes as three types according to different propagation paths of ultrasonic beams, where the three types of wave modes comprise:

a direct mode, where the ultrasonic beam is emitted by one element, interacts with a crack, and is directly received by array element;

a half-skip mode, where the ultrasonic beam is emitted by one element and reflected by a bottom of the to-be-measured sample, interacts with the crack, and is received by array element; and a full-skip mode, where the ultrasonic beam is emitted by one element and reflected by the bottom of the to-be-measured sample, interacts with the crack, is reflected by the bottom of the sample, and is received by array element; and mode conversion occurs at the interface between the wedge and the sample, the bottom of the sample, and the crack surface, so the three types of wave modes are divided into 21 views, which contain 3 views in direct mode (LL, TT, and LT, where L for longitudinal wave and T for transverse wave), 8 views in half-skip mode (TLT, LLT, TTT, LTT, LLL, TLL, TTL, and LTL), and 10 views in full-skip mode (LLLL, TTTT, LLLT, LLTT, LLTL, LTLT, TLTT, TLTL, LTTT, and LTTL);

(e) solving positions of refracted points, comprising:

defining abscissas of the refracted points at the interface between the wedge and the sample for the emitted and received signals in view p as $x_{pi}$ and $x_{pj}$, respectively; establishing equation (1) according to the Fermat's principle:

$$\frac{\partial t_{pi}}{\partial x_{pi}} = \frac{\partial t_{pj}}{\partial x_{pj}} = 0, \qquad (1)$$

wherein $1 \leq p \leq 21$, $t_{pi}$ is travel time of an ultrasonic beam excited from i-th element and to the reconstruction point, and $t_{pj}$ is travel time of the ultrasonic beam from the reconstruction point to j-th element, where $1 \leq i \leq n$ and $1 \leq j \leq n$; and calculating $t_{pi}$ and $t_{pj}$ according to ray paths of the ultrasonic beams and the wave modes;

(f) image reconstruction by the composite-mode total focusing method, comprising:

for each reconstruction point (a, b) in the region of interest, where $1 \leq a \leq M$, $1 \leq b \leq N$, selecting a strongest response from the 21 views for the signal $A_{ij}$ transmitted by the i-th element and received by the j-th element as a corresponding reconstruction amplitude $I_{ij}(a, b)$:

$$I_{ij}(a, b) = \max_{1 \leq p \leq 21} (A_{ij}(t_p(a, b))), \qquad (2)$$

in which, $t_p(a, b)$ is a travel time following the path of a p-th view via the reconstruction point (a, b);

repeating the above steps point by point in the region of interest to obtain the reconstructed image by the composite-mode total focusing method, where the composite delay-and-sum amplitude I(a, b) of the image reconstruction point (a, b) is:

$$I(a, b) = \sum_{i=1}^{n} \sum_{j=1}^{n} I_{ij}(a, b); \qquad (3)$$

and (g) quantification, positioning, and orientation of cracks, comprising:

using −6 dB drop rule to obtain depths, lengths, and inclined angles of the cracks with different orientation angles according to the composite-mode total focusing image.

* * * * *